(12) United States Patent
Watanabe

(10) Patent No.: US 11,105,418 B2
(45) Date of Patent: Aug. 31, 2021

(54) VEHICLE

(71) Applicant: TOYOTA JIDOSHA KABUSHIKI KAISHA, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/779,855

(22) Filed: Feb. 3, 2020

(65) Prior Publication Data

US 2020/0271220 A1 Aug. 27, 2020

(30) Foreign Application Priority Data

Feb. 22, 2019 (JP) .............................. JP2019-030058

(51) Int. Cl.
| | | |
|---|---|---|
| *F16H 61/16* | (2006.01) | |
| *F16H 61/02* | (2006.01) | |
| *F16H 61/18* | (2006.01) | |
| *F16H 61/00* | (2006.01) | |

(52) U.S. Cl.
CPC ......... *F16H 61/0213* (2013.01); *F16H 61/16* (2013.01); *F16H 61/18* (2013.01); *F16H 2061/0087* (2013.01); *F16H 2061/0239* (2013.01); *F16H 2708/22* (2013.01); *F16H 2710/04* (2013.01); *F16H 2710/22* (2013.01)

(58) Field of Classification Search
CPC ............... F16H 2059/506; F16H 59/66; F16H 61/0213; F16H 61/16; F16H 61/18; F16H 2061/0234; F16H 2061/0239; F16H 2061/163; F16H 2061/0087
See application file for complete search history.

(56) References Cited

U.S. PATENT DOCUMENTS

| | | | |
|---|---|---|---|
| 10,386,838 B2 * | 8/2019 | Kumakiri | ............ B60R 16/0231 |
| 10,400,888 B2 * | 9/2019 | Jerger | ..................... F16H 59/66 |
| 2009/0018732 A1* | 1/2009 | Choby | ..................... F16H 59/66 |
| | | | 701/51 |
| 2015/0217771 A1* | 8/2015 | Kelly | .................. B60W 30/025 |
| | | | 701/93 |
| 2016/0347314 A1* | 12/2016 | Kuwahara | ........... B60W 10/184 |

FOREIGN PATENT DOCUMENTS

| | | |
|---|---|---|
| JP | 11-34689 A | 2/1999 |
| JP | 2009-138873 A | 6/2009 |
| JP | 2018-90161 A | 6/2018 |
| JP | 2018-95076 A | 6/2018 |

* cited by examiner

*Primary Examiner* — Edwin A Young
(74) *Attorney, Agent, or Firm* — Sughrue Mion, PLLC

(57) ABSTRACT

An ECU determines whether or not a road surface changes from a low μ road surface to a high μ road surface based on image data obtained by a camera sense. When the ECU determines that the accelerator pedal operation amount deceases greatly in a predetermined determination period from a time point at which a drive wheel slip state occurs in a case where the ECU determines that the road surface changes from the low μ road surface to the high μ road surface, it prohibits upshift operation of an automatic transmission over a predetermined period from that time point.

5 Claims, 5 Drawing Sheets

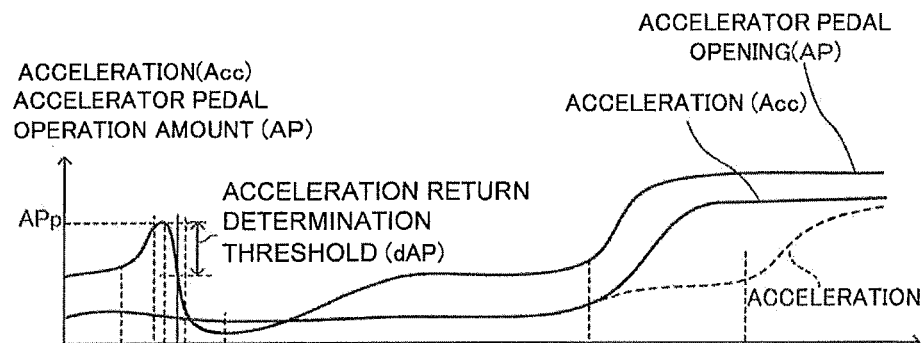
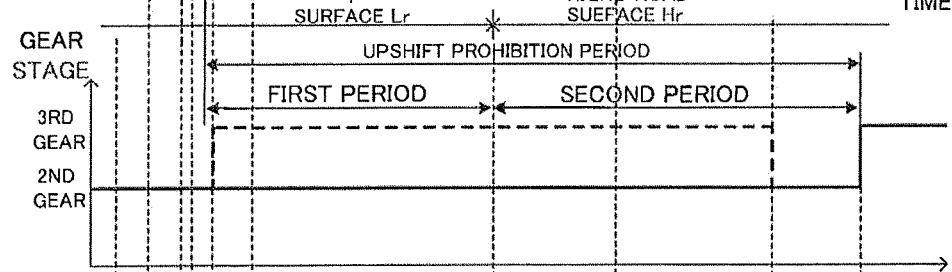
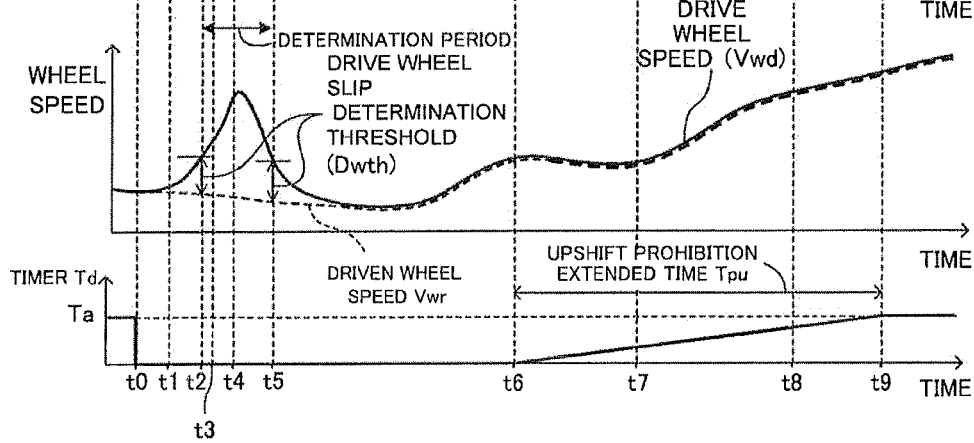

VEHICLE

BACKGROUND OF THE INVENTION

1. Field of the Invention

The present invention relates to a vehicle including an automatic transmission having a plurality of gear stages.

2. Description of the Related Art

A "vehicle control apparatus including an automatic transmission having a plurality of gear stages", which has been known, applies an accelerator pedal operation amount AP and a vehicle speed Vs to "a shift map defining shift lines" shown in FIG. 3 as an example of a look-up table, to determine a gear stage to be selected by the automatic transmission.

That vehicle control apparatus causes the automatic transmission to upshift or downshift, so as to match an actual gear stage of the automatic transmission with the determined gear stage (refer to Japanese Patent Application Laid-Open No. 2009-138873).

A case may occur where the vehicle travels on a road in which a road surface changes from a low μ road surface having a relatively small road surface friction coefficient to a high μ road surface having a relatively large road surface friction coefficient. That is, the case may occur where a road surface friction coefficient of the road surface of the road on which the vehicle is traveling changes from a high μ to a low μ while the vehicle traveling on the road. In this case, as described below, a situation may occur where a driver of the vehicle feels that acceleration of the vehicle is insufficient. That is, the situation may occur where the vehicle does not or is hard to accelerate sufficiently even when an accelerator pedal of the vehicle is depressed. Hereinafter, the situation is referred to as "acceleration hesitation".

For example, it is assumed that a situation occurs where the road surface of the road on which the vehicle is traveling changes from the low μ road surface to the high μ road surface when the vehicle with the gear stage of its transmission set to "2nd gear" is traveling on the low μ road surface. When the driver recognizes/notices that "the road surface changes from the low μ road surface to the high μ road surface in front of (ahead of) the vehicle" by a visual observation, there may arise a case where the driver determines that the vehicle can be accelerated without slip of the drive wheels (drive wheel slip) and increases the accelerator pedal operation amount AP.

In this case, a force transmitted/supplied to the drive wheels becomes large, and thus, the drive wheel slip may occur if the drive wheels are still on the low μ road surface. The driver notices the occurrence of that drive wheel slip, and then decreases the accelerator pedal operation amount AP greatly. When the gear stage to be selected by the automatic transmission changes to "3rd gear" as a result of this decrease in the accelerator pedal operation amount AP, the automatic transmission upshifts from the "2nd gear" to the "3rd gear".

As a result of the decrease in the accelerator pedal operation amount AP, the drive wheel slip disappears. Thereafter, the vehicle enters the high μ road surface. When this happens, a case may occur where the driver determines that the drive wheel slip no longer occurs, and thus, increases the accelerator pedal operation amount AP again in order to accelerate the vehicle. However, since the gear stage is the "3rd gear" at this time point, the acceleration of the vehicle does not increase to a degree expected by the driver. This is one of reasons of the occurrence of the above-described "acceleration hesitation".

The increase in the accelerator pedal operation amount AP causes the gear stage of the automatic transmission to be changed to the "2nd gear" through downshifting from the "3rd gear" to the "2nd gear". However, since it takes considerable time for the gear stage to be changed from the "3rd gear" to the "2nd gear", the acceleration hesitation continues. In addition, the driver receives shift shock caused by the downshift from the "3rd gear" to the "2nd gear". Furthermore, since the acceleration increases stepwise from a time point at which the gear stage has changed to the "2nd gear", the driver feels so-called "step change-in-acceleration".

SUMMARY OF THE INVENTION

The present invention has been made in order to cope with the above-described problems. That is, an object of the present invention is to provide a vehicle including an automatic transmission and configured in such a manner that both of the "acceleration hesitation" and the "step change-in-acceleration" are hard to occur when the vehicle moves/runs from the low μ road surface to the high μ road surface.

A vehicle (10) according to an embodiment of the present invention comprises an automatic transmission (15) configured to be capable of:

achieving selectively one of a first gear stage (e.g., 2nd gear stage) and a second gear stage (e.g., 3rd gear stage) which is a higher speed gear stage as compared to the first gear stage; and transmitting a driving force generated by a driving force generation device (13) of the vehicle to drive wheels (12L, 12R) of the vehicle thorough the achieved gear stage.

The first gear stage corresponds to a lower speed gear stage, and the second gear stage corresponds to a higher speed gear stage with respect to the lower speed gear stage and has a gear ration smaller than a gear ratio of the first gear stage.

The vehicle (10) comprises a control unit (20) configured to:

determine the gear stage to be achieved by the automatic transmission based on a vehicle speed (Vs) and an accelerator pedal operation amount (Ap); and control the automatic transmission so as to conform the gear stage achieved by the automatic transmission to the determined gear stage; and an imaging device (25) configured to photograph subjects including a road surface in front of the vehicle to thereby obtain image data.

Furthermore, the control device is configured to:

determine whether or not a first condition is satisfied (refer to step 505), the first condition being a condition to be satisfied when a drive wheel slip state in which the drive wheels are in slip states is occurring;

obtain, based on the image data, a first value ($\mu 1$) and a second value ($\mu 2$) (refer to step 520), the first value correlating with a road surface friction coefficient of a first area which is a first part within the road surface; and the second value correlating with a road surface friction coefficient of a second area which is a second part within the road surface, the second area located in front of and adjacent to the first area;

determine whether or not the second condition is satisfied, the second condition being a condition to be satisfied when a difference index value ($\Delta\mu=|\mu1-\mu2|$) indicative of a degree of a difference between the first value and the second value is equal to or larger than a road surface change determination threshold ($\mu$th) (refer to step 525);

determine whether or not a third condition is satisfied, the third condition being a condition to be satisfied when the accelerator pedal operation amount (AP) decreases by an amount larger than a predetermined return determination threshold (dAP) in a predetermined determination period starting after it has been determined that the first condition is satisfied (refer to step 540); and control the automatic transmission in such a manner that the automatic transmission does not execute an upshift operation from the first gear stage to the second gear stage in a predetermined upshift prohibition period which starts from a start time point at which an upshift prohibition condition becomes satisfied (step 545, step 560, step 620, step 640, step 650), the upshift prohibition condition being a condition to be satisfied when it is determined that the second condition is satisfied and the third condition is satisfied.

In this vehicle, the first value correlating with (or corresponding to) the road surface friction coefficient of the first area and the second value correlating with (or corresponding to) the road surface friction coefficient of the second area are obtained, based on the image data obtained by the imaging device, and it is determined whether or not the difference index value (for example, an absolute value of the difference between these values (the first value and the second value)) indicative of the degree of the difference between these values is equal to or larger than the road surface change determination threshold. That is, it is determined whether or not the second condition is satisfied. When the difference index value is equal to or larger than the road surface change determination threshold, the road surface in front of (ahead of) the vehicle is highly likely to change from the low μ road surface to the high μ road surface.

In this case, the driver recognizes/notices that the road surface changes from the low μ road surface to the high μ road surface visually, determines that the drive wheel slip will not occur (or no longer occurs), and thus, may increase the accelerator pedal operation amount sharply. When this happens, if the drive wheels are still on the low μ road surface, the drive wheel slip occurs. When the driver notices the occurrence of the drive wheel slip, the driver decreases the accelerator pedal operation amount greatly/sharply. The upshift (the upshift from the first gear stage to the second gear stage on the high speed side with respect to the first gear stage) is executed due to the decrease in the accelerator pedal operation amount. This upshift may cause the acceleration hesitation as described above.

In view of the above, when the accelerator pedal operation amount has decreased by the value larger than the predetermined return determination threshold in the predetermined determination period after the control unit has determined that the first condition became satisfied (i.e., when the third condition is satisfied), the control unit determines that this change (the large decrease) in the accelerator pedal operation amount by the driver has occurred. The first condition is a condition to be satisfied when the drive wheel slip state is occurring. Furthermore, when the control unit determines that the above-described second condition has become satisfied and the third condition becomes satisfied, the control unit does not upshift during a predetermined prohibition period. That is, the upshift operation is prohibited during the predetermined prohibition period.

Therefore, the vehicle can be accelerated smoothly when the driver increases the accelerator pedal operation amount again after the vehicle actually enters the high μ road surface, since the gear stage at that time point is the first gear stage on the low speed side rather than the second gear stage on the high speed side. In other words, the acceleration hesitation does not occur. Furthermore, since the downshift does not occur after the driver increases the accelerator pedal operation amount again, neither the shift shock nor the step change-in-acceleration occurs.

In one of aspects of the above-mentioned vehicle, the control unit is configured to define the predetermined upshift prohibition period as a total period of a first period and a second period, the first period being a period starting from a time point at which the upshift prohibition condition becomes satisfied (refer to a "Yes" determination at each of step 525 and step 540) to a time point at which the difference index value becomes smaller than the road surface change determination threshold (refer to a "No" determination at step 525), and the second period being a period starting from an end time point of the first period to a time point at which a predetermined time elapses from end time point of the first period (refer to a "Yes" determination at step 555).

According to the above-mentioned aspect, the upshift is prohibited in not only the the first period up to a time point at which the vehicle enters the high μ road surface but also in the second period after the first period. After the second period, the vehicle is highly likely to be traveling on the high μ road surface. Therefore, according to this aspect, since the upshift operation is prohibited (not executed) in a more appropriate period, the above-described acceleration hesitation can be more reliably prevented.

In one of aspects of the above-mentioned vehicle, the control unit is configured to define the predetermined determination period as a period starting from a time point at which it is determined that the first condition becomes satisfied to a time point at which it is determined that the first condition is no longer satisfied (refer to steps 505, 510, and 540).

According to the above-mentioned aspect, whether or not the returning operation of the accelerator pedal has occurred can be reliably determined, the returning operation of the accelerator pedal being an operation which is a cause to prohibit the upshift (operation) in order to prevent the above-described occurrence of the acceleration hesitation.

In one of aspects of the above-mentioned vehicle, the control unit is configured to:

obtain a first friction coefficient ($\mu1$) indicative of the road surface friction coefficient of the first area as the first value, based on a feature amount (imaging feature amount) acquired from first data corresponding to the first area within the image data (refer to step 520);

obtain a second friction coefficient ($\mu2$) indicative of the road surface friction coefficient of the second area as the second value, based on a feature amount (imaging feature amount) acquired from second data corresponding to the second area within the image data (refer to step 520); and use an absolute value ($\Delta\mu=|\mu1-\mu2|$) of a difference between the first friction coefficient and the second friction coefficient, as the difference index value (refer to step 525).

In one of aspects of the above-mentioned vehicle, the control unit is configured to: have stored a relationship between a combination of luminance and RGB value both obtained based on the image data as the feature amount and the road surface friction coefficient, in advance;

obtain the first friction coefficient (μ1) based on the luminance and the RGB value acquired from the first image data and the stored relationship (refer to step 520); and obtain the second friction coefficient (μ2) based on the luminance and the RGB value acquired from the second image data and the stored relationship (refer to step 520).

According to these above-mentioned aspects, they can easily obtain the first value corresponding to the road surface friction coefficient of the first area and the second value corresponding to the road surface friction coefficient of the second area, based on the image data.

In the above description, the terms and/or the reference symbols used in the following description regarding the embodiment(s) are added with parentheses to the elements of the present invention, in order to assist in understanding the present invention. However, those terms and/or reference symbols should not be used to limit the scope of the invention. Other objects, other features, and accompanying advantages of the present invention will be readily understood from the description of embodiment(s) of the present invention to be given referring to the following drawings.

BRIEF DESCRIPTION OF DRAWINGS

FIG. 4A is a graph illustrating various values when the vehicle shown in FIG. 1 travels on a road in which a road surface friction coefficient changes from a low μ road surface to a high μ road surface.

FIG. 4B is the graph illustrating the various values when the vehicle shown in FIG. 1 travels on the road in which the road surface friction coefficient changes from the low μ road surface to the high μ road surface.

FIG. 4C is the graph illustrating the various values when the vehicle shown in FIG. 1 travels on the road in which the road surface friction coefficient changes from the low μ road surface to the high μ road surface.

FIG. 4D is the graph illustrating the various values when the vehicle shown in FIG. 1 travels on the road in which the road surface friction coefficient changes from the low μ road surface to the high μ road surface.

DETAILED DESCRIPTION OF THE EMBODIMENT

Figure 1:
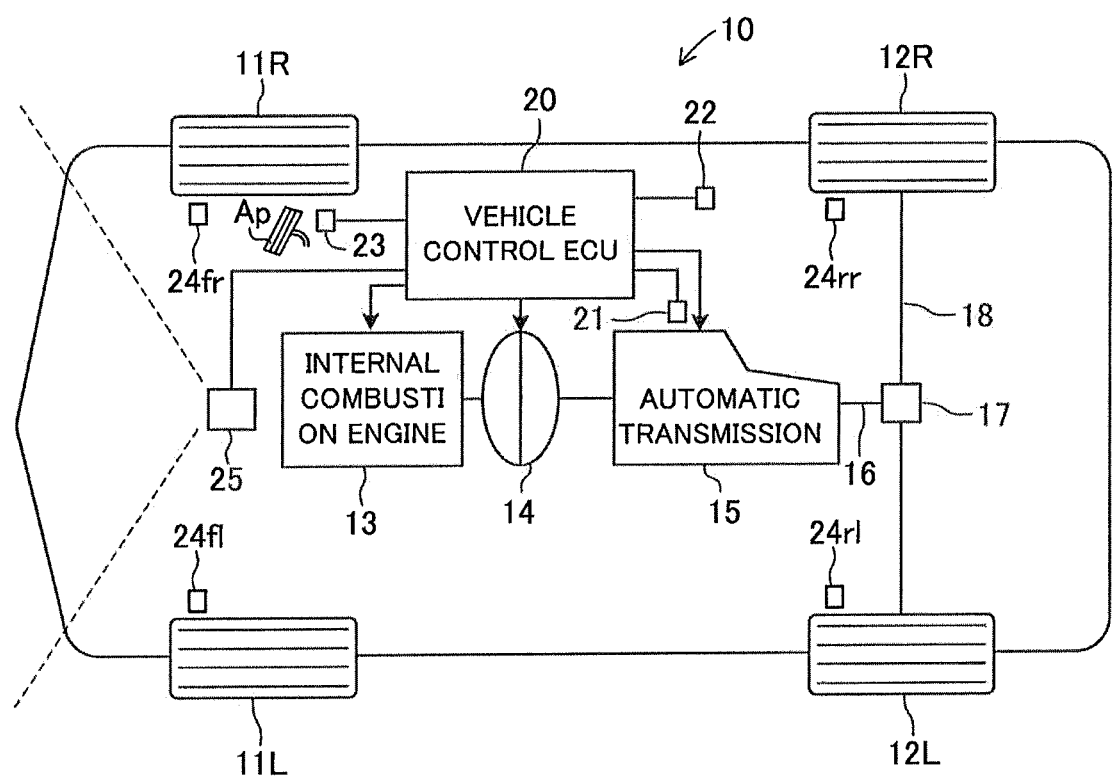
FIG. 1 is a schematic overall view illustrating a vehicle according to an embodiment of the present invention.

Hereinafter, a vehicle 10 according to an embodiment of the present invention will be described below, referring to the drawings.

As shown in FIG. 1, a vehicle 10 has a left front wheel 11L, a right front wheel 11R, a left rear wheel 12L, and a right rear wheel 12R. The left front wheel 11L and the right front wheel 11R are rolling wheels (driven wheels). The left rear wheel 12L and the right rear wheel 12R are drive wheels. The vehicle 10 includes an internal combustion engine 13, a torque converter 14 as a coupling device, an automatic transmission 15 (a multi-speed automatic transmission 15) having a plurality of gear stages (gear positions), and a vehicle control ECU 20. Hereinafter, the vehicle control ECU 20 is referred to as an "ECU 20".

The internal combustion engine 13 is a gasoline-fuel-injection spark-ignition type internal combustion engine and is a driving force generation device for vehicle 10. A crankshaft rotates using a driving force (a torque) generated by the internal combustion engine 13. The ECU 20 controls engine actuators (not shown) of the internal combustion engine 13 to thereby be able to change the driving force generated by the internal combustion engine 13. The engine actuators include fuel injection valves (injectors), throttle valve actuators, and an ignition device. For example, the ECU 20 controls the engine actuators in such a manner the driving force generated by the internal combustion engine 13 increases as the accelerator pedal operation amount AP detected by an accelerator pedal operation amount sensor 23 described later increases.

A torque converter 14 is a hydraulic torque converter with a lock-up clutch. An input shaft of the torque converter 14 is connected to the crankshaft of the internal combustion engine 13. An output shaft of the torque converter 14 is connected to the input shaft of the automatic transmission 15. The torque converter 14 transmits a force (i.e., a rotation torque) generated at (supplied to) the crankshaft of the internal combustion engine 13 to the input shaft of the automatic transmission 15 while amplifying/increasing the generated force.

The automatic transmission 15 sets at least any one of a plurality of friction engagement devices to an engagement state to thereby change meshing states of multiple gear members so as to select one of multiple gear stages (gears). The gear stages of the automatic transmission 15 include gear stages (hereinafter, referred to as "gear stages for forward movement") used in order for the vehicle to move forward and a gear stage (hereinafter, referred to as a "gear stage for backward movement") used in order for the vehicle to move backward. The gear stages for forward movement include "1st gear", "2nd gear", "3rd gear", and "4th gear". A gear ratio is small in the order of the 1st gear", the "2nd gear", the "3rd gear", and the "4th gear". In other words, the gear ratio of the 1st gear is the largest. The gear ratio of the 2nd gear is smaller than that of the 1st gear. The gear ratio of the 3rd gear is smaller than that of the 2nd gear. The gear ratio of the 4th gear is smaller than that of the 3rd gear. That is, "N gear" (N is any one of 1st to 4th) is a gear on the higher speed side with respect to "N−1 gear". On the other hand, the gear stage for backward movement is only the back gear.

The rotation torque transmitted/supplied to the input shaft of the automatic transmission 15 is transmitted/supplied to the output shaft of the automatic transmission 15 through gears corresponding to the selected gear stage. The rotation torque transmitted/supplied to the output shaft of the automatic transmission 15 is transmitted/supplied to the left rear wheel 12L and the right rear wheel 12R through a propeller shaft 16, a differential gear 17, a drive shaft 18, and the like. Pressure of hydraulic oil supplied to the automatic transmission 15 changes depending on a switching state (an open or closed state) of each of multiple solenoid switching valves provided in a hydraulic circuit of the automatic transmission 15. The switching state of each of the multiple solenoid switching valves is controlled by the ECU 20. Therefore, the gear stage of the automatic transmission 15 is changed/shifted by the ECU 20. In other words, the ECU 20 can cause the automatic transmission 15 to execute the upshift operation and the downshift operation. It should be noted that the upshift operation is an operation to shift the gear stage from a gear stage (a gear stage having a relatively large gear ratio) on the low speed side to a gear stage (a gear stages having a relatively small gear ratio) on the high speed side. The downshift operation is an operation to shift the gear stage from the gear stage on the high speed side to the gear stage on the low speed side.

The ECU 20 is connected to a gear identification sensor 21, a shift lever position detection sensor 22, the accelerator pedal operation amount sensor 23, wheel speed sensors 24fl, 24fr, 24rl, 24rr, and a camera sensor 25. The ECU 20 is configured to obtain detection values of those sensors, every time a predetermined time elapses.

The gear identification sensor 21 (gear identification means, a gear stage sensor) is provided in the vicinity of the automatic transmission 15 and outputs a signal indicative of each of the switching states of the above-described multiple solenoid valves. Therefore, the ECU 20 can specify an actual gear stage (a gear stage actually achieved/realized at the present time point) among the gear stages based on the signals transmitted from the gear identification sensor 21.

The shift lever position detection sensor 22 outputs a signal indicative of a shift position of a shift lever (not shown) provided in a vehicle cabin of the vehicle 10. The shift lever is configured to be capable of being moved into any one of six ranges of a D (drive) range, an L (1st speed) range, a 2 (2nd speed) range, an R (reverse) range, and a N (neutral) range.

The accelerator pedal operation amount sensor 23 outputs a signal indicative of the operation amount (i.e., the accelerator pedal operation amount AP: an accelerator pedal position) of an accelerator pedal Ap provided in the vehicle 10. It should be noted that the accelerator pedal operation amount AP is also referred to as an "acceleration operation amount" and the accelerator pedal Ap is sometimes referred to as an "acceleration operation element".

The wheel speed sensor 24fl is disposed in the vicinity of the left front wheel 11L. The wheel speed sensor 24fr is disposed in the vicinity of the right front wheel 11R. The wheel speed sensor 24rl is disposed in the vicinity of the left rear wheel 12L. The wheel speed sensor 24rr is disposed in the vicinity of the right rear wheel 12R. Each of those wheel speed sensors generates one pulse, every time the wheel corresponding to the wheel speed sensor rotates by a predetermined angle. The ECU 20 counts the number of the pulses generated by each of the wheel speed sensors in a predetermined period to obtain/calculate the wheel speed of the wheel corresponding to each of the wheel speed sensors 24fl, 24fr, 24rl, and 24rr based on that counted value. The ECU 20 calculates an average value of the wheel speed of the left front wheel 11L and the wheel speed of the right front wheel 11R as a "driven wheel speed Vwr". Similarly, the ECU 20 calculates an average value of the wheel speed of the left rear wheel 12L and the wheel speed of the right rear wheel 12R as a "drive wheel speed Vwd". Furthermore, the ECU 20 calculates an average value (i.e., an average value of four wheel speeds) of the drive wheel speed Vwd and the driven wheel speed Vwr as a vehicle speed Vs of the vehicle 10, every time a predetermined time elapses.

Figure 2:
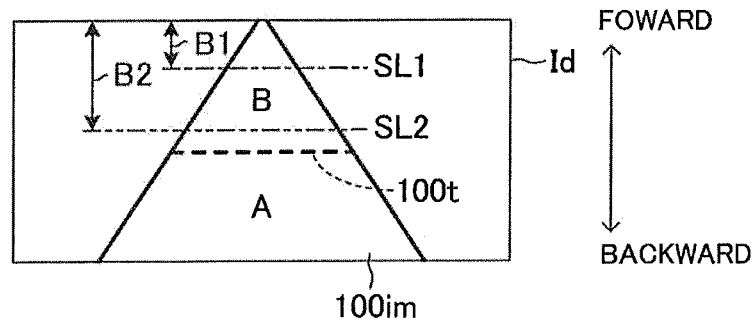
FIG. 2 illustrates an example of an image photographed by a camera sensor (an imaging device) of the vehicle according to the embodiment of the present invention.

The camera sensor (the imaging device) 25 is disposed at a position immediately behind a front windshield (not shown) and in the vehicle cabin of the vehicle 10. The camera sensor 25 repeatedly photographs (captures an image of) subjects including a road surface located in front of (ahead of) the vehicle 10 through the front windshield so as to generate image data Id, every time a predetermined time elapses. The camera sensor 25 transmits that generated image data Id to the ECU 20. FIG. 2 shows an example of the image data Id photographed by the camera sensor 25 when the vehicle 10 is traveling on a road. The road corresponds to a road imaging area 100im in the image data Id.

It should be noted that each of a focal length of a lens of the camera sensor 25, an angle of view of the lens, and a mounting angle of the camera sensor 25 with respect to a vehicle body of the vehicle 10 have been set/designed in such a manner that the camera sensor 25 can photograph (capture an image of) "an object located at a position ahead of the vehicle 10" which the driver having a standard physique can see through the front windshield. More specifically, each of the focal length of the lens, the angle of view of the lens, and the mounting angle of the camera sensor 25 have been set in such a manner that the camera sensor 25 can photograph the ground (the road surface) located between a first position and a second position. The first position is a position 50 cm away in the forward direction from a front end of the vehicle 10. The second position is a position 50 m away in the forward direction from a front end of the vehicle 10.

The ECU 20 is a microcomputer including a CPU, a ROM, a RAM, a backup RAM, and an interface including an AD converter, that are connected to each other through a bus. The "ECU" is an abbreviation for "Electronic Control Unit". The programs executed by the CPU, a map (a look-up table), a numeric constant, and the like have been stored in the ROM in advance. The RAM temporarily holds data in response to an instruction transmitted from the CPU.

Next, various operations executed by the ECU 20 will be described.

<Determination of Whether or Not Drive Wheel Slip State is Occuring>

The ECU 20 calculates a value, as a wheel speed difference Dw (=Vwd−Vwr), by subtracting the driven wheel speed Vwr from the drive wheel speed Vwd, every time a predetermined time elapses. The ECU 20 determines whether or not the wheel speed difference Dw is larger than a drive wheel slip determination threshold Dwth. Hereinafter, the drive wheel slip determination threshold Dwth is simply referred to as a "determination threshold Dwth". When the wheel speed difference Dw is larger than the determination threshold Dwth, the ECU 20 determines that a drive wheel slip state (an acceleration slip state) is occurring. The drive wheel slip state is a state where the drive wheels are in slip states (or are slipping). In contrast, when the wheel speed difference Dw is equal to or smaller than the determination threshold Dwth, the ECU 20 determines that the drive wheel slip state is not occurring. A condition that the wheel speed difference Dw is larger than the determination threshold Dwth is a condition to be satisfied when the drive wheel slip state is occurring. That condition is also referred to as a "first condition", for convenience. It should be noted that when an absolute value of a difference between the smallest wheel speed among the four wheel speeds and the larger wheel speed between the wheel speed of the left rear wheel 12L and the wheel speed of the right rear wheel 12R is larger than the determination threshold Dwth, the ECU 20 may determine that the drive wheel slip state is occurring.

<Switching Determination of the Road Surface Friction Coefficient Based on Image Processing>

The ECU 20 executes the following image processing, every time a predetermined time elapses. Firstly, the ECU 20 extracts a road imaging area 100im (refer to FIG. 2) which is the image data representing/expressing the road from the image data Id using a well-known pattern matching method.

Secondly, as shown in FIG. 2, the ECU 20 divides the road imaging area 100*im* into a first area A and a second area B.

The first area A is an area located backward (lower in FIG. 2) with respect to a boundary line 100*t* within the road imaging area 100*im*. The boundary line 100*t* is a straight line indicative of the center position in the front-rear direction of the road imaging area 100*im*. That is, the boundary line 100*t* is a straight line indicative of the center position in the upper-lower direction of the road imaging area 100*im* shown in FIG. 2.

The second area B is an area next to (continuous with) the first area A and is located forward (upper in FIG. 2 and far away with respect to the vehicle 10) with respect to the boundary line 100*t* within the road imaging area 100*im*.

A "look-up table Map p (Lu, RGB value)" has been stored in the ROM of the ECU 20 in advance. The Lu is luminance. Each of the luminance Lu and the RGB value is a so-called feature amount of the image data representing the road surface. The look-up table Map u (Lu, RGB value) defines a relationship between "the luminance Lu and an RGB value" and a "friction coefficient $\mu$ (i.e., the road surface friction coefficient $\mu$) between the road surface and the rear wheels 12L and 12R".

The ECU 20 obtains the luminance Lu and the RGB value of each of the first area A and the second area B, based on the image data indicative of the road imaging area 100*im*. The ECU 20 applies "an average value of the luminance Lu and an average value of the RGB value" in the entire first area A to the look-up table Map u (Lu, RGB value) to thereby calculate (extrapolate) a first friction coefficient $\mu1$ which is a value (also referred to as a "first value") corresponding to the road surface friction coefficient of the first area A. Similarly, the ECU 20 applies "an average value of the luminance Lu and an average value of the RGB value" in the entire second area B to the look-up table Map u (Lu, RGB value) to thereby calculate (extrapolate) a second friction coefficient $\mu2$ which is a value (also referred to as a "second value") corresponding to the road surface friction coefficient of the second area B.

The ECU 20 determines whether or not an absolute value ($\Delta\mu$ (=|$\mu1-\mu2$|)) of a difference between the first friction coefficient $\mu1$ and the second friction coefficient $\mu2$ is equal to or larger than a predetermined friction threshold $\mu$th (also refer to a "road surface change determination threshold $\mu$th"). The absolute value $\Delta\mu$ is a difference index value indicative of a degree of a difference between the value (the first value) corresponding to the road surface friction coefficient of the first area A and the value (the second value) corresponding to the road surface friction coefficient of the second area B. The difference index value is larger as that degree of the difference is larger. When the ECU 20 determines that the absolute value $\Delta\mu$ is equal to or larger than the predetermined friction threshold $\mu$th, it recognizes that one of the first area A and the second area B is a "low $\mu$ road surface Lr" and the other is a "high $\mu$ road surface Hr". That is, when the absolute value $\Delta\mu$ (=|$\mu1-\mu2$|) is equal to or larger than the predetermined friction threshold $\mu$th, the ECU 20 determines that the road surface friction coefficient changes/switches from the road surface friction coefficient of the first area A to that of the second area B in the near future if the vehicle 10 travels forward. In other words, the ECU 20 recognizes the change in the road surface friction coefficient $\mu$.

<Shift Control>

Figure 3:
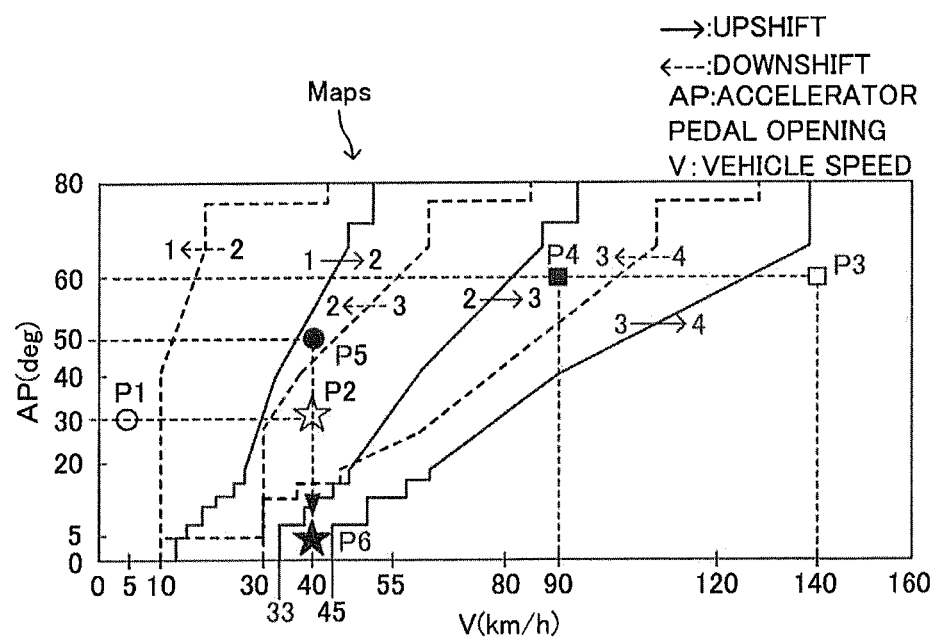
FIG. 3 illustrates a shift map referenced by a vehicle control ECU shown in FIG. 3.

When the ECU 20 determines that "the shift position of the shift lever is at the D range" based on the output value of the shift lever position detection sensor 22, it controls the automatic transmission 15 based on the accelerator pedal operation amount AP, the vehicle speed Vs, and a shift-table Map s (Ap, Vs) shown in FIG. 3. The shift-table Map s (AP, Vs) is the look-up table and is also referred to as a "shift map". That is, the ECU 20 applies the accelerator pedal operation amount AP and the vehicle speed Vs to the shift-table Map s (AP, Vs) to thereby select/determine the gear stage to be selected/realized by the automatic transmission 15 among the 1st gear, the 2nd gear, the 3rd gear, and the 4th gear. More specifically, when an operating point represented by the accelerator pedal operation amount AP and the vehicle speed Vs crosses a shift line (an upshift line) for the upshift shown by a solid line in FIG. 3, the ECU 20 causes the automatic transmission 15 to execute the upshift operation corresponding to that upshift line. Similarly, when the operating point represented by the accelerator pedal operation amount AP and the vehicle speed Vs crosses a shift line (a downshift line) for the downshift shown by a broken line in FIG. 3, the ECU 20 causes the automatic transmission 15 to execute the downshift operation corresponding to that downshift line.

For example, when the accelerator pedal operation amount AP is 30 (deg) and the vehicle speed Vs is 5 (km/h) (refer to a point P1 shown in FIG. 3: a white open circle mark), the ECU 20 selects the "1st gear" as the gear stage to be achieved/realized by the automatic transmission 15. Thereafter, the ECU 20 controls the multiple solenoid valves to thereby set the actual gear stage of the automatic transmission 15 to the "1st gear". Since the operating point crosses the 1st-2nd upshift line when the vehicle speed Vs becomes 40 (km/h) while the accelerator pedal operation amount AP is maintained at 30 (deg) in a case where the gear stage of the automatic transmission 15 is the "1st gear" (refer to a point P2 shown in FIG. 3: a white star mark), the ECU 20 selects the "2nd gear" as the gear stage to be achieved/realized by the automatic transmission 15. Thereafter, the ECU 20 controls the multiple solenoid valves to thereby set the actual gear stage of the automatic transmission 15 to the "2nd gear". In this case, the automatic transmission 15 upshifts the actual gear stage from the 1st gear to the 2nd gear.

For example, when the accelerator pedal operation amount AP is 60 (deg) and the vehicle speed Vs is 140 (km/h) (refer to a point P3 shown in FIG. 3: a white square mark), the ECU 20 selects the "4th gear" as the gear stage to be achieved/realized by the automatic transmission 15. Thereafter, the ECU 20 controls the multiple solenoid valves to thereby set the actual gear stage of the automatic transmission 15 to the "4th gear". Since the operating point crosses the 4th-3rd downshift line when the vehicle speed Vs becomes 90 (km/h) while the accelerator pedal operation amount AP is maintained at 60 (deg) in a case where the gear stage of the automatic transmission 15 is the "4th gear" (refer to a point P4 shown in FIG. 3: a black square mark), the ECU 20 selects the "3rd gear" as the gear stage to be achieved/realized by the automatic transmission 15. Thereafter, the ECU 20 controls the multiple solenoid valves to thereby set the actual gear stage of the automatic transmission 15 to the "3rd gear". In this case, the automatic transmission 15 downshifts the actual gear stage from the 4th gear to the 3rd gear.

<Operation When the Road Surface Friction Coefficient Changes/Switches>

Next, the operation of the ECU 20 of when the vehicle 10 first travels on the low $\mu$ road surface Lr and then, travels on the high μ road surface Hr will be described, referring to an example shown in FIGS. 4A to 4D.

A graph shown in FIG. 4A (i.e., a first graph from the top of FIGS. 4A to 4D) is a graph indicating a relationship between the accelerator pedal operation amount AP and the acceleration Acc of the vehicle 10, with respect to time.

A graph shown in FIG. 4B (i.e., a second graph from the top of FIGS. 4A to 4D) is a graph indicating the gear stage of the automatic transmission 15 with respect to time, in the above-described case shown in FIG. 4A.

A graph shown in FIG. 4C (i.e., a third graph from the top of FIGS. 4A to 4D) is a graph indicating the wheel speeds (the drive wheel speed Vwd and the driven wheel speed Vwr) with respect to time, in the above-described case shown in FIG. 4A.

A graph shown in FIG. 4D (i.e., a fourth graph from the top of FIGS. 4A to 4D) is a graph indicating an upshift prohibition timer Td described below with respect to time, in the above-described case shown in FIG. 4A.

As shown by a solid line in FIG. 4B, at time t0, the gear stage of the automatic transmission 15 is the "2nd gear". At time t0, the vehicle speed Vs is 40 km/h and the accelerator pedal operation amount AP is 30 (deg). Furthermore, before time t0, the driver recognizes only the low μ road surface Lr visually. On the other hand, before time t0, the absolute value Δμ of the difference is smaller than the predetermined friction threshold μth. Therefore, the ECU 20 has not yet recognized the change/switch of the road surface friction coefficient μ before time t0.

Between time t0 and time t1, the driver of the vehicle 10 recognizes visually that the high μ road surface Hr is present in front of (ahead of) the low μ road surface Lr. As shown in FIG. 2, the road surface friction coefficient μ of an area shown by an arrow B1 (i.e., a first front part area B1 of the second area B) located at a forward/upper side with respect to a dash-dot-dash line SL1 is larger than a road surface friction coefficient μ of an area located at a backward/lower side with respect to the dash-dot-dash line SL1, and is larger than a road surface friction coefficient μ of the first area A. However, since a ratio of an area of the first front part area B1 to an area of the entire second area B is small, the second friction coefficient μ2 of the second area B which is calculated based on the table Map u (Lu, RGB value) is close to the first friction coefficient μ1 of the first area A which is calculated based on the look-up table Map u (Lu, RGB value). Therefore, the absolute value Δμ (=|μ1−μ2|) of the difference is smaller than the predetermined friction threshold μth. For this reason, the ECU 20 does not recognize that the first area A and the second area B have different road surface friction coefficients μ from each other. That is, the ECU 20 does not recognize that the road surface of the first area A is one of the low μ road surface Lr and the high μ road surface Hr; and the road surface of the second area B is the other. In other words, the ECU 20 does not still recognize the switch/change of the road surface friction p.

As shown by a solid line in FIG. 4A, the driver who has recognized that the high p road surface Hr is present in front of the low μ road surface Lr between time t0 and time t1 supposes that the drive wheel slip will not occur, and starts to increase the accelerator pedal operation amount AP sharply at time t1. For this reason, the accelerator pedal operation amount AP increases to a provisional/tentative peak value APp at time t3.

The accelerator pedal operation amount AP increases sharply after t1, so that a driving torque (the force, the driving force) applied to the drive wheels (the rear wheels 12R and 12L) increases sharply. Whereas, the vehicle 10 still travels on the low μ road surface Lr. For this reason, as shown in FIG. 4C, the drive wheel speed Vwd increases sharply and then, at time t2, the difference (i.e., the wheel speed difference Dw) between the drive wheel speed Vwd and the driven wheel speed Vwr becomes larger than the drive wheel slip determination threshold Dwth. Therefore, the ECU 20 determines that the drive wheel slip state has occurred at time t2. Namely, the ECU 20 determines that the first condition becomes satisfied.

Meanwhile, since the vehicle 10 continues traveling forward after time t1, as shown in FIG. 2, at time t2, a road surface friction coefficient μ of an area shown by an arrow B2 in FIG. 2 (i.e., a second front part area B2 of the second area B) located at a forward/upper side with respect to a two-dot chain line SL2 is larger than a road surface friction coefficient μ of an area located at a backward/lower side with respect to the two-dot chain line SL2, and is larger than a road surface friction coefficient μ of the first area A. In this case, a ratio of an area of the second front part area B2 to an area of the entire second area B is relatively large. Therefore, the second friction coefficient μ2 of the second area B which is calculated based on the look-up table Map u (Lu, RGB value) becomes relatively larger than the first friction coefficient μ1 of the first area A which is calculated based on the look-up table Map u (Lu, RGB value). Thus, since the absolute value Δμ (=|μ1−μ2|) of the difference becomes equal to or larger than the predetermined friction threshold μth, the ECU 20 recognizes/regards one of the first area A and the second area B as the low μ road surface Lr and the other as the high μ road surface Hr. That is, the ECU 20 recognizes the switch/change of the road surface friction coefficient μ. In this case, the ECU 20 determines that the second condition has become satisfied.

It should be noted that it is not possible to determine which one of the first area A and the second area B is the low μ road surface Lr and the other is the high μ road surface Hr based on the result of the determination of whether or not the absolute value Δμ (=|μ1−μ2|) of the difference is equal to or larger than the predetermined friction threshold μth. However, when the drive wheel slip state is occurring in the vehicle 10 traveling on the first area A, the first area A is likely to be the low μ road surface Lr, and therefore, the second area B is likely to be the high μ road surface Hr.

While driving the vehicle, the driver can notice/experience that the drive wheel slip has been occurring. Therefore, when the driver has noticed that the drive wheel slip state is occurring immediately after time t2, the driver decreases the accelerator pedal operation amount AP sharply as shown in FIG. 4A after time t3. As a result, immediately before time t4, the accelerator pedal operation amount AP becomes a value smaller than a value (=APp−dAP) obtained by subtracting an acceleration return determination threshold dAP from the provisional/tentative peak value APp. In this case, the ECU 20 determines that a third condition has become satisfied. For example, the accelerator pedal operation amount AP becomes the provisional/tentative peak value APp (50 deg) at time t3, and thereafter, the accelerator pedal operation amount AP becomes 5 deg at time t4. The acceleration return determination threshold dAP is set at 30 deg. Therefore, the accelerator pedal operation amount AP becomes smaller than the value (=APp−dAP) immediately before time t4, and thus, the third condition becomes satisfied.

When the ECU 20 determines that the third condition is satisfied in a predetermined period starting from a time point at which it determines that the first condition is satisfied after it determines that the second condition has been satisfied, it determines that a "predetermined upshift prohibition condition" becomes satisfied. More specifically, when the ECU 20 determines that the second condition has been satisfied (it has recognized the change of the road surface friction coefficient μ) and the third condition has just been satisfied (when it determines that the accelerator pedal operation amount AP decreases sharply) in the predetermined determination period after a time point at which the first condition becomes satisfied (a time point at which it determines that the drive wheel slip occurs), it determines that the "predetermined upshift prohibition condition" is satisfied.

Meanwhile, according to the shift-table Map s (AP, Vs) shown in FIG. 3, when the accelerator pedal operation amount AP decreases/changes from 50 (deg) to 5 (deg) in a case where the vehicle speed Vs is in the range from 33 (km/h) to 45 (km/h), the gear stage to be achieved/realized by the automatic transmission 15 changes from the "2nd gear (refer to a point P5: a black circle mark) to the "3rd gear" (refer to a point P6: a black star mark and refer to a broken line in FIG. 4B). That is, the operating point represented by the accelerator pedal operation amount AP and the vehicle speed Vs crosses a "2nd-3rd upshift line". For this reason, the ECU 20 determines that the upshift operation from the "2nd gear" to the "3rd gear" is necessary. However, if the upshift operation from the 2nd gear to the 3rd gear is allowed, when the driver of the vehicle 10 traveling on the high μ road surface depresses the accelerator pedal Ap again, sufficient acceleration is not generated. That is, acceleration hesitation occurs. Alternatively, since the accelerator pedal Ap is again depressed and thereby, the downshift operation from the 2nd gear to the 3rd gear is executed, shift shock and step change-in-acceleration after the shift shock occur.

Therefore, when the ECU 20 determines that the upshift prohibition condition becomes satisfied, the ECU 20 prohibits the upshift operation in a predetermined upshift prohibition period from the time point at which the ECU 20 determines that the upshift prohibition condition becomes satisfied. That is, as shown by the solid line in FIG. 4B, the ECU maintains the gear stage at the "2nd gear" without shifting the gear stage into the "3rd gear" at time t4.

Thereafter, the vehicle 10 continues traveling forward. Thus, after t6, the ECU 20 does not recognize that the first area A and the second area B have different road surface friction coefficients μ from each other after time t6. That is, the ECU 20 does not recognize that the road surface of the first area A is one of the low μ road surface Lr and the high μ road surface Hr; and the road surface of the second area B is the other. In other words, the ECU 20 determines that the vehicle 10 has reached the boundary from the low μ road surface Lr to the high μ road surface Hr or vice versa at time t6. A period from a time point at which the upshift prohibition condition becomes satisfied to a time point at which it is determined that the vehicle 10 has reached the boundary from the low μ road surface Lr to the high μ road surface Hr or vice versa is also referred to as a "first period", for convenience.

The ECU 20 starts to count/increment an upshift prohibition timer Td from a time point (time t6) at which the vehicle 10 has reached the boundary from the low μ road surface Lr to the high μ road surface Hr or vice versa. The ECU 20 continues prohibiting the upshift until a time point (time t9) at which the value of the upshift prohibition timer Td reaches a value Ta corresponding to an upshift prohibition extended time Tpu. In other words, the ECU 20 continues prohibiting the upshift in a period (also referred to as a "second period", for convenience) from a time point at which it is recognized that the vehicle 10 has reached the boundary from the low μ road surface Lr to the high μ road surface Hr or vice versa to a time point at which the upshift prohibition extended time Tpu elapses. Therefore, even when the operating point represented by the accelerator pedal operation amount AP and the vehicle speed Vs changes to a point which requires the gear stage to be shifted from the "2nd gear" to the "3rd gear" in that period, the ECU 20 maintains the gear stage at the "2nd gear (i.e., the actual gear stage realized at the time point at which the upshift prohibition condition becomes satisfied)".

Therefore, as shown in FIG. 4A, since the gear stage is maintained at the 2nd gear when the driver who has recognized that the vehicle 10 has entered the high μ road surface Hr increases the accelerator pedal operation amount AP sharply at time t7, the acceleration Acc of the vehicle 10 increases quickly and smoothly. Therefore, the acceleration hesitation does not occur. Furthermore, since the downshift from the 3rd gear to the 2nd gear is not executed, neither the shift shock nor the step change-in-acceleration after the shift shock occurs.

After a time point (time t9) at which a value of the upshift prohibition timer Td reaches the value corresponding to the upshift prohibition extended time Tpu, the ECU 20 allows the upshift operation. Therefore, after time t9, when the operating point represented by the accelerator pedal operation amount AP and the vehicle speed VS is a point at which the gear stage should be shifted from the "2nd gear" to the "3rd gear", the ECU 20 shifts/upshifts the actual gear stage from the "2nd gear" to the "3rd gear", as shown by a solid line in FIG. 4B.

<Specific Operation>

Figure 5:
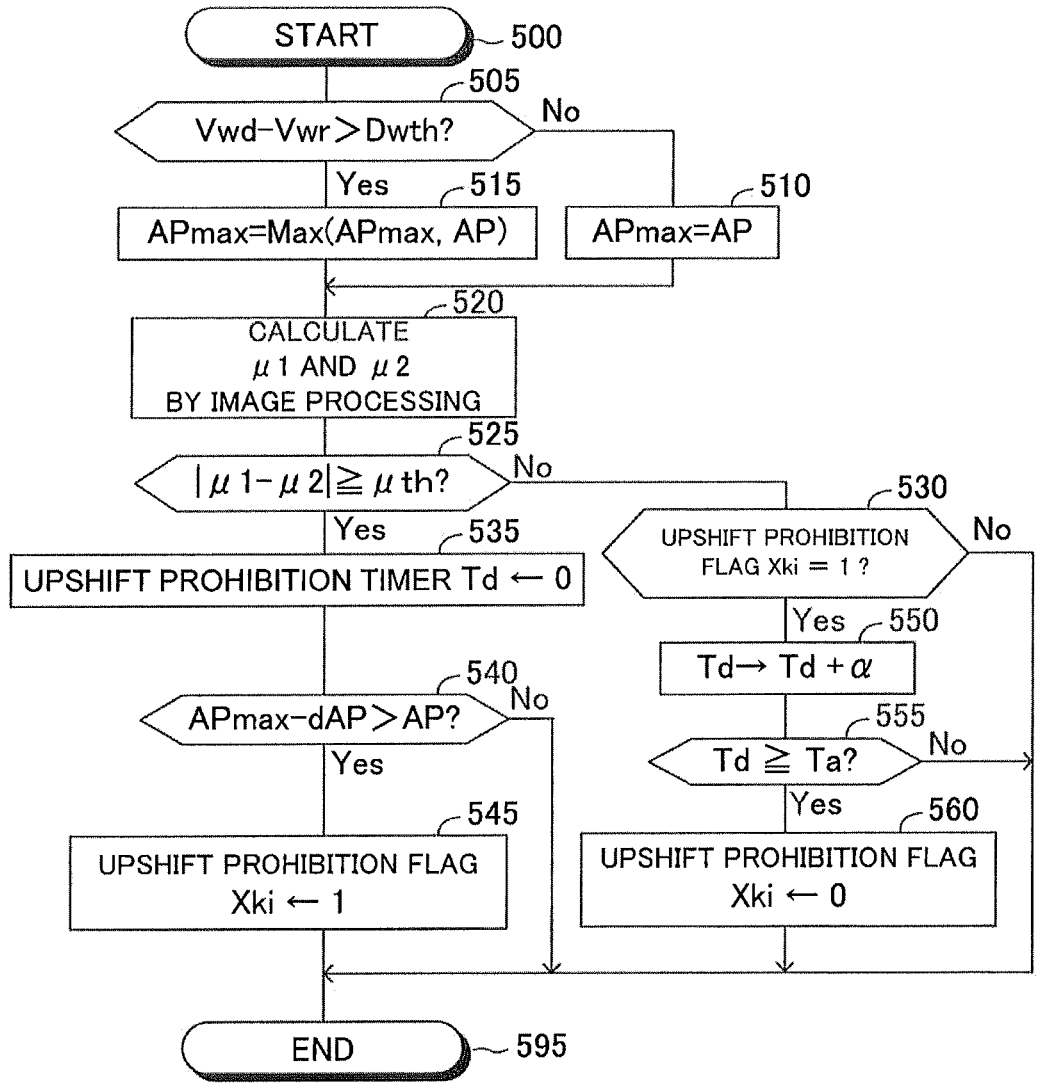
FIG. 5 is a flowchart illustrating a routine executed by the vehicle control ECU in FIG. 1.
Figure 6:
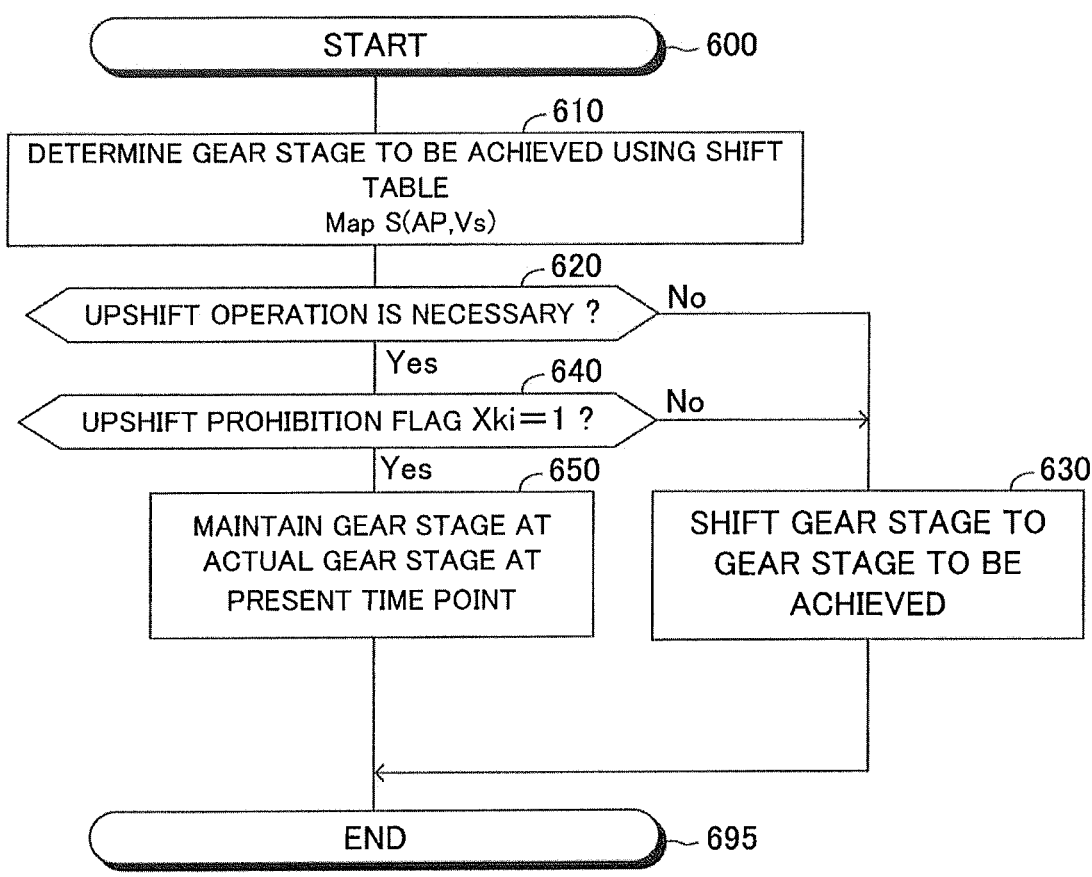
FIG. 6 is a flowchart illustrating a routine executed by the vehicle control ECU in FIG. 1.

The ECU 20 is configured to execute each of routines shown by flowcharts in FIG. 5 and FIG. 6, every time a predetermined time elapses.

Therefore, when a predetermined timing arrives, the CPU starts processing from step 500 in FIG. 5 and proceeds to step 505 to determine whether or not the wheel speed difference Dw which is a value (=Vwd−Vwr) obtained by subtracting the driven wheel speed Vwr from the drive wheel speed Vwd is larger than the drive wheel slip determination threshold Dwth.

If the drive wheel slip state is not occurring, the wheel speed difference Dw is equal to or smaller than the determination threshold Dwth. In this case, the CPU makes a "No" determination at step 505 to proceed to step 510. At step 510, the CPU adopts/employs the accelerator pedal operation amount AP at the present time point as an accelerator pedal operation max value APmax. Hereinafter, the accelerator pedal operation max value APmax is also referred to as a "max value APmax". Thereafter, the CPU proceeds to step 520.

In contrast, if the drive wheel slip state is occurring, the wheel speed difference Dw is larger than the determination threshold Dwth. In this case, the CPU makes a "Yes" determination at step 505 and proceeds to step 515 to select "the accelerator pedal operation amount AP at the present time point" or "the max value APmax which has been obtained by the present time point", whichever is greater, as the max value APmax. Thereafter, the CPU proceeds to step 520. The CPU obtains the max value APmax (i.e., the provisional/tentative peak value APp) of the accelerator pedal operation amount AP in a period in which the drive wheel slip state is occurring, through the above processes.

At step 520, the CPU uses the image data including the road imaging area 100*im* and the look-up table Map u (Lu, RGB value) to thereby calculate the first friction coefficient μ1 and the second friction coefficient μ2, as described above.

Then, the CPU proceeds to step 525 to determine whether or not the absolute value Δμ (=|μ1−μ2|) of the difference between the first friction coefficient μ1 and the second friction coefficient μ2 is equal to or larger than the predetermined friction threshold μth. The absolute value Δμ of the difference is a difference index value which increases as a degree of a difference between a value μ1 and a value μ2 becomes larger. The value μ1 is a value corresponding to the road surface friction coefficient of the first area A. The value μ2 is a value corresponding to the road surface friction coefficient of the second area B. Alternatively, the CPU may adopt/employ, as the difference index value, a "value μ1/μ2" in the case of μ1>μ2 and a "value μ2/μ1" in the case of μ2>μ1.

Here, it is assumed that the vehicle 10 is traveling on a road whose road friction coefficient μ substantially remains unchanged over a considerably long distance. In this case, since the absolute value Δμ of the difference is smaller than the predetermined friction threshold μth, the CPU makes a "No" determination at step 525 and proceeds to step 530 to determine whether or not a value of an upshift prohibition flag Xki is "1".

The upshift prohibition flag XKi indicates that the upshift operation is prohibited when its value is "1". The upshift prohibition flag XKi indicates that the upshift operation is allowed (is not prohibited) when its value is "0". It should be noted that the value of the upshift prohibition flag XKi is set to "0" through an initialization routine (not shown) executed by the CPU when the ignition key switch (not shown) of the vehicle 10 is changed from an OFF position to an ON position.

Normally, the value of the upshift prohibition flag XKi is "0". In this case, the CPU makes a "No" determination at step 530 and directly proceeds to step 595 to tentatively terminate the present routine.

In contrast, if the vehicle 10 is traveling on the road whose surface changes from the high μ road surface to the low μ road surface or vice versa at a position in front of (ahead of) the vehicle 10, the absolute value Δμ (=|μ1−μ2|) of the difference between the first friction coefficient μ1 and the second friction coefficient μ2 becomes equal to or larger than the predetermined friction threshold μth. In this case, the CPU makes a "Yes" determination at step 525 and proceeds to step 535 to set the value of the upshift prohibition timer Td to "0".

Then, the CPU proceeds to step 540 to determine whether or not a value (=APmax−dAP) obtained by subtracting the acceleration return determination threshold dAP from the max value APmax of the accelerator pedal operation amount AP is larger the accelerator pedal operation amount AP at the present time point. That is, the CPU determines whether or not the accelerator pedal operation amount AP has decreased from the provisional/tentative peak value APp by a value larger than the acceleration return determination threshold dAP.

When the value (=APmax−dAP) is equal to or smaller than the accelerator pedal operation amount AP at the present time point (i.e., when the accelerator pedal operation amount AP has not yet decreased greatly), the CPU makes a "No" determination at step 540 and directly proceeds to step 595 to tentatively terminate the present routine.

In contrast, the value (=APmax−dAP) is larger than the accelerator pedal operation amount AP at the present time point (i.e., when the accelerator pedal operation amount AP has decreased greatly), the CPU makes a "Yes" determination at step 540 and proceeds to step 545 to set the value of the upshift prohibition flag XKi to "1". Thereafter, the CPU proceeds to step 595 to tentatively terminate the present routine. Thereby, the upshift operation is prohibited, as described later.

As described above, the CPU obtains the max value APmax (i.e., the provisional/tentative peak value APp) of the accelerator pedal operation amount AP in the period in which the drive wheel slip state is occurring. Meanwhile, the CPU sets the max value APmax to a value equal to the accelerator pedal operation amount AP when the drive wheel slip state is not occurring (refer to step 510). Therefore, the CPU determines whether or not the accelerator pedal operation amount AP has decreased from the provisional/tentative peak value APp by the value larger than the acceleration return determination threshold dAP through the processes of steps 505, 510, and 540.

Thereafter, the vehicle 10 continues moving forward. When the road surface friction coefficient of the road surface on which the vehicle 10 is traveling changes, the absolute value Δμ (=|μ1−μ2|) of the difference between the first friction coefficient μ1 and the second friction coefficient μ2 becomes smaller than the predetermined friction threshold μth. In this case, when the CPU proceeds to step 525, the CPU makes a "No" determination at that step 525 to proceed to step 530.

When this happens, the value of the upshift prohibition flag Xki is "1". Therefore, the CPU makes a "Yes" determination at step 530 and proceeds to step 550 to increase the value of the upshift prohibition timer Td by a predetermined positive value α. Then, the CPU proceeds to step 555 to determine whether or not the value of the upshift prohibition timer Td is equal to or larger than a time threshold Ta (=the value Ta corresponding to the upshift prohibition extended time Tpu).

The value of the upshift prohibition timer Td is smaller than the time threshold Ta immediately after the value of the upshift prohibition flag XKi changes from "0" to "1". Therefore, the CPU makes a "No" determination at step 555 and directly proceeds to step 595 to tentatively terminate the present routine.

When this state continues, the value of the upshift prohibition timer Td is gradually increased through the process of step 550 and becomes equal to or larger than the time threshold Ta. In this case, at step 555, the CPU makes a "Yes" determination at step 555 and proceeds to step 560 to set the value of the upshift prohibition flag XKi to "0". As a result, after this time point, the upshift operation is allowed.

Meanwhile, at a predetermined timing, the CPU starts processing from step 600 of FIG. 6 to proceed to step 610. At step 610, the CPU applies the accelerator pedal operation amount AP and the vehicle speed Vs to the shift-table Map s (Ap, Vs) shown in FIG. 3 to determine the gear stage to be achieved/realized by the automatic transmission 15.

Next, at step 620, the CPU determines whether or not the upshift operation is necessary. More specifically, the CPU determines whether or not a relationship between "the actual gear stage at the present time point which is obtained based on the detection value outputted from the gear identification sensor 21" and "the gear stage to be achieved/realized which has been determined at step 610" is a relationship which requires the upshift operation. It should be noted that the CPU may obtain the actual gear stage at the present time point based on the drive signals being transmitted from the ECU 20 to the multiple solenoid switching valves of the automatic transmission 15.

When the upshift operation is not necessary, the CPU makes a "No" determination at step 620 and proceeds to step 630 to shift the actual gear stage into "the gear stage to be achieved/realized which has been determined at step 610" or to maintain the actual gear stage at "the gear stage to be achieved/realized which has been determined at step 610". In this case, if "the actual gear stage at the present time point" and "the actual gear stage to be achieved/realized which has been determined at step 610" are the same as each other, the CPU maintains the gear stage at the actual gear stage at the present time point. In contrast, if "the actual gear stage at the present time point" and "the actual gear stage to be achieved/realized which has been determined at step 610" are different from each other, the CPU executes the necessary shift operation (in this case, the downshift operation).

In contrast, when it is determined that the upshift operation is necessary at a time point at which the CPU executes the process of step 620, the CPU makes a "Yes" determination at step 620 to proceed to step 640. At step 640, the CPU determines whether or not the value of the upshift prohibition flag XKi is "1".

When the value of the upshift prohibition flag XKi is "1", the CPU makes a "Yes" determination at step 640 and proceeds to step 650 to maintain the gear stage at the actual gear stage at the present time point. Therefore, the upshift operation is prohibited.

In contrast, when the value of the upshift prohibition flag XKi is "0", the CPU makes a "No" determination at step 640 to proceed to 630. Therefore, the upshift operation is executed.

As described above, according to the vehicle 10, when the vehicle 10 is traveling on the road whose road surface friction ρ switches/changes from a low value to a high value, it can prevent the driver from feeling that the acceleration of the vehicle 10 is insufficient (that is, it can prevent the occurrence of the acceleration hesitation). In addition, the vehicle 10 can prevent the occurrence of the shift shock and the step change-in-acceleration. It should be noted that the present invention is not limited to the above embodiment, and various modified examples based on the technical idea within the scope of the present invention can be employed/adopted.

For example, the automatic transmission 15 may have 5th gear in addition to the 1st to 4th gears as the gear stage for forward movement. In addition, the automatic transmission 15 may have a 6th gear. Alternatively, the automatic transmission 15 has only the 1st to 3rd gear stages as the gear stages for forward movement. That is, the automatic transmission 15 may be configured to be capable of achieving/realizing the gear stages (the gear stages having a relatively large gear ratio) on the low speed side and the gear stages (the gear stages having a relatively small gear ratio) on the high speed side.

In the predetermined upshift prohibition period, the ECU 20 may prohibit only the upshift from the "2nd gear" to the "3rd gear" and may allow the other upshift (for example, the upshift from the "1st gear" to the "2nd gear" and from the "3rd gear" to the "4th gear"). In this case, the CPU may determine whether or not the upshift from the "2nd gear" to the "3rd gear" is necessary at step 620.

The predetermined upshift prohibition period is the period which starts from a time point serving as the start point at which the above-described upshift prohibition condition becomes satisfied. In addition, the predetermined upshift prohibition period is the period which ends at a time point serving as the end point at which the upshift prohibition extended time Tpu has elapsed from the time point at which the ECU 20 recognizes that the vehicle 10 has reached the boundary form the low μ road surface Lr to the high μ road surface Hr or vice versa. However, the predetermined upshift prohibition period may be a period which includes only the above-described first period.

Although the vehicle 10 has the internal combustion engine 13 as the driving force generation device, the present invention is also applicable to a hybrid vehicle having both of "the internal combustion engine and an electric motor" as the driving force generation device of the vehicle 10. Furthermore, the present invention is also applicable to an "electric vehicle (EV) or fuel cell vehicle (FC vehicle)" having only the electric motor as the driving force generation device of the vehicle 10.

The ECU 20 calculates/obtains the first friction coefficient μ1 and the second friction coefficient μ2 using the look-up table Map u (Lu, RGB value) and determines whether or not the road surface friction coefficient switches/changes in the near future using the absolute value Δμ of the difference between the calculated first friction coefficient μ1 and the calculated second friction coefficient μ2. In contrast, the ECU 20 may be configured to determine whether or not the road surface friction coefficient switches/changes in the near future, as described below.

That is, the ECU 20 calculates "a high μ feature area ratio" for each of the first area A and the second area B. The high μ feature area ratio is a ratio of an area of a total of "a part which has "a high μ feature" to an area of each of the first area A and the second area B. The high μ feature is a feature which a "road surface having a relatively high road surface friction coefficient μ" has. The high μ feature is a feature in the image data represented by a color of the image, brightness of the image, roughness of the image, and the like (refer to Japanese Patent Application Laid-Open No. 2018-90161, Japanese Patent Application Laid-Open No. 2018-95076).

Then, the ECU 20 determines whether or not the absolute value of the difference between the high μ feature area ratio of the area A and the high μ feature area ratio of the area B is larger than a predetermined threshold. When the absolute of the difference is determined to be larger than the predetermined threshold, the ECU 20 determines that the road surface friction switches/changes in the near future.

The ECU 20 may be configured to obtain the vehicle speed Vs of the vehicle 10 from the vehicle speed sensor which generates an output value changing depending on the rotation speed of the propeller shaft 16.

The first friction coefficient μ1 and the second friction coefficient μ2 may be calculated by a processing device provided in the camera sensor 25 and those calculated results may be transmitted to the ECU 20.

The ECU 20 may divide the road imaging area 100im into three or more areas in the front rear direction. In this case, the ECU 20 selects two areas adjacent to each other in the front rear direction among the divided areas. Then, the ECU 20 regards one of the two areas which is closer to the vehicle 10 than the other area of the two areas, as the "first area A". The ECU 20 regards the other area of the two areas (the area located ahead of the "first area A"), as the "second area B".

In another modification, the CPU may be configured to execute the determination process of step 540 immediately before step 520. In this configuration, when the CPU makes a "Yes" determination at step 540, the CPU may be configured to proceed to step 520. When the CPU makes a "No" determination at step 540, the CPU may be configured to proceed to step 595 directly. In this case, the CPU may be configured to execute the process of step 545 immediately after step 535.

What is claimed is:

1. A vehicle comprising:
an automatic transmission configured to:
achieve selectively one of a first gear stage and a second gear stage which is a higher speed gear stage as compared to the first gear stage; and
transmit a driving force generated by a driving force generation device of said vehicle to drive wheels of said vehicle thorough said achieved gear stage;
an electronic control unit including a processor and a memory programmed to:
determine said gear stage to be achieved by said automatic transmission based on a vehicle speed and an accelerator pedal operation amount; and
control said automatic transmission so as to conform said gear stage achieved by said automatic transmission to said determined gear stage; and
a camera that photographs subjects including a road surface in front of said vehicle to thereby obtain image data,
wherein, said electronic control unit is further programmed to:
determine whether or not a first condition is satisfied, said first condition being a condition to be satisfied when a drive wheel slip state in which said drive wheels are in slip states is occurring;
obtain, based on said image data, a first value and a second value,
said first value correlating with a road surface friction coefficient of a first area which is a first part within said road surface; and
said second value correlating with a road surface friction coefficient of a second area which is a second part within said road surface, said second area located in front of and adjacent to said first area;
determine whether or not a second condition is satisfied, said second condition being a condition to be satisfied when a difference index value indicative of a degree of a difference between said first value and said second value is equal to or larger than a road surface change determination threshold;
determine whether or not a third condition is satisfied, said third condition being a condition to be satisfied when said accelerator pedal operation amount decreases by an amount larger than a predetermined return determination threshold in a predetermined determination period starting after it has been determined that said first condition is satisfied; and
control said automatic transmission in such a manner that said automatic transmission does not execute an upshift operation from said first gear stage to said second gear stage in a predetermined upshift prohibition period which starts from a start time point at which an upshift prohibition condition becomes satisfied, said upshift prohibition condition being a condition to be satisfied when it is determined that said second condition is satisfied and said third condition is satisfied.

2. The vehicle according to claim 1,
wherein, said electronic control unit is programmed to define said predetermined upshift prohibition period as a total period of a first period and a second period, said first period being a period starting from a time point at which said upshift prohibition condition becomes satisfied to a time point at which said difference index value becomes smaller than said road surface change determination threshold, and said second period being a period starting from an end time point of said first period to a time point at which a predetermined time elapses from said end time point of said first period.

3. The vehicle according to claim 1,
wherein, said control unit is further programmed to define said predetermined determination period as a period starting from a time point at which it is determined that said first condition becomes satisfied to a time point at which it is determined that said first condition is no longer satisfied.

4. The vehicle according to claim 1,
wherein, said electronic control unit is further programmed to:
obtain a first friction coefficient indicative of said road surface friction coefficient of said first area as said first value, based on a feature amount acquired from first data corresponding to said first area within said image data;
obtain a second friction coefficient indicative of said road surface friction coefficient of said second area as said second value, based on a feature amount acquired from second data corresponding to said second area within said image data; and
use an absolute value of a difference between said first friction coefficient and said second friction coefficient, as said difference index value.

5. The vehicle according to claim 4,
wherein, said electronic control unit is further programmed to:
have stored a relationship between a combination of luminance and RGB value both obtained based on said image data as said feature amount and said road surface friction coefficient, in advance;
obtain said first friction coefficient based on said luminance and said RGB value acquired from said first image data and said stored relationship; and
obtain said second friction coefficient based on said luminance and said RGB value acquired from said second image data and said stored relationship.

* * * * *